United States Patent [19]
Sullivan, Jr.

[11] Patent Number: 5,183,143
[45] Date of Patent: Feb. 2, 1993

[54] APPARATUS AND METHODS FOR CONVEYING MATERIALS

[75] Inventor: James F. Sullivan, Jr., Garland, Tex.

[73] Assignee: Triple/S Dynamics, Inc., Dallas, Tex.

[21] Appl. No.: 708,288

[22] Filed: May 31, 1991

[51] Int. Cl.$^5$ .............................................. B65G 37/00
[52] U.S. Cl. .................... 198/370; 198/609; 198/766
[58] Field of Search ............... 198/358, 365, 366, 370, 198/609, 766

[56] References Cited

U.S. PATENT DOCUMENTS

| | | | |
|---|---|---|---|
| 2,776,741 | 1/1957 | Carrier, Jr. | 198/370 |
| 2,806,583 | 9/1957 | Morris | 198/370 |
| 3,605,996 | 9/1971 | Holman | 198/609 |
| 3,731,787 | 5/1973 | Gregor | 198/370 X |
| 3,817,370 | 6/1974 | Cox | 198/766 X |
| 3,917,050 | 11/1975 | Gregor | 198/365 X |

Primary Examiner—Robert P. Olszewski
Assistant Examiner—Cheryl L. Gastineau
Attorney, Agent, or Firm—Schwartz & Weinrieb

[57] ABSTRACT

Conveying apparatus and methods employ a continuously vibrating element and a plurality of longitudinally aligned, overlapping, inclined conveyor pans, each of which has its own independently operable discharge gate. Material may be moved by the conveyor from a source to one or more material discharge destinations by selectively coupling and uncoupling predetermined conveyor pans to the continuously vibrating element. When not coupled to the continuously vibrating element, the conveyor pans are at rest in motionless isolation from the pans that are vibrating.

21 Claims, 2 Drawing Sheets

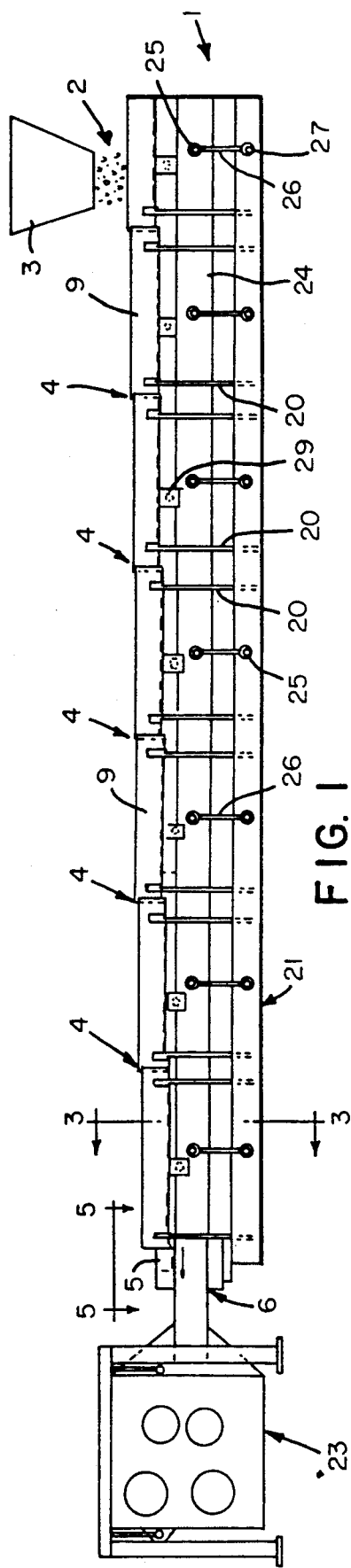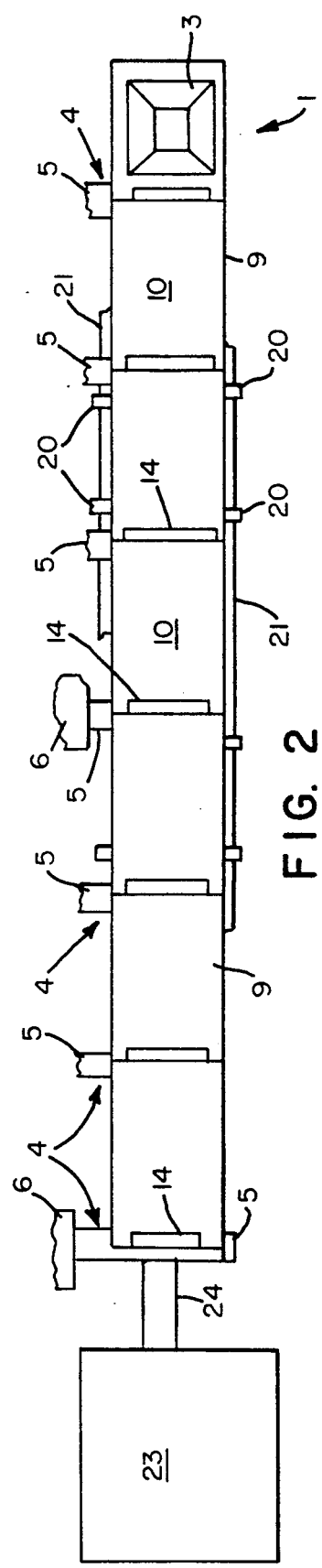

APPARATUS AND METHODS FOR CONVEYING MATERIALS

BACKGROUND OF THE INVENTION

This invention relates to vibrating conveyors, and more particularly to vibrating conveyor systems that distribute dry materials from a single source to multiple discharge locations.

To maximize the productivity of food product packaging equipment, product must be delivered as quickly as possible to any packaging machine which signals that the machine needs more product. Such machines are set out in a line which is fed from above by a series of vibrating conveyors that are aligned end-to-end, with a drop gate installed at the end of each conveyor pan. The gate opens and discharges product to the packaging machine when needed. To assure instantaneous product delivery to any of the open gates, the conveyor pans are equipped with level sensing monitors which, along with the signals from the packaging machines, provide the input for a control circuit that decides when to open gates, and when to run conveyors in order to maintain full product levels in each conveyor pan and in each packaging machine. During the operation of the packaging equipment, new product is continuously introduced to the system. When a packaging machine signals for more product, all conveyor pans preceeding the conveyor pan feeding that particular machine must be activated to convey product along the chain of conveyor pans to the pan in need, which opens its discharge gate. When that particular machine's demand for product is met, the conveyor pans feeding product to and toward it stop vibrating, and the gate of the pan feeding it closes. Each conveyor pan must operate independently of every other conveyor pan because only certain specific pans need to be operated to feed each specific machine. Prior art conveyors have employed a separate independent small motors and vibrating drive mechanism for each conveyor pan. The line of conveyor pans must operate with each pan starting and stopping quickly to satisfy changes in demand from the various packaging machines. This causes short cycles for the separate drive mechanisms and motors for the individual conveyor pans, which results in excessive wear of the machinery and maintenance cost, and increased down time of the packaging line.

OBJECTIVES OF THE INVENTION

It is an object of this invention to provide improved vibrating conveyor machinery and methods.

Another object is to decrease the wear on vibrating conveyors that results from frequent stopping and starting of many motors and vibration producing mechanisms.

A further object is to provide methods and apparatus for conveying in which one component vibrates continuously and the remaining components vibrate intermittently.

Another object is to apply slow-advance, quick return vibration action to a conveyor through the use of a single driven member which can drive numerous individual pans on demand.

Still another object is to provide vibrating conveyor apparatus and methods which can selectively deliver food products to predetermined spaced packaging machines.

A still further object is to provide a line of tandem conveyor pans with a source of continuous vibrations that can be connected to and disconnected from one or more selected individual pans in the line with the disconnected pans being held motionless.

Another object is to provide relatively simple, durable, easily maintained vibrating conveyors and methods for transporting dry materials from a source to numerous spaced locations that quickly respond to changes in the demand for such dry materials at any of the spaced locations, and which do not possess defects found in similar prior art conveyors and methods.

Other objects and advantages of the invention will be found in the specification and claims, and the scope of the invention will be set forth in the claims.

DESCRIPTION OF THE DRAWING

FIG. 1 is a schematic side view of an embodiment of the invention.

FIG. 2 is a partial plan view of the embodiment of FIG. 1.

DESCRIPTION OF THE INVENTION

Figure 5:
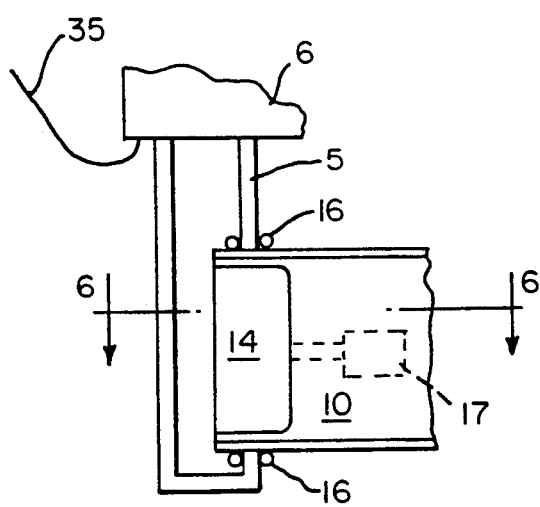
FIG. 5 is an enlarged partial top view taken generally along the line 5—5 in FIG. 1.
Figure 6:
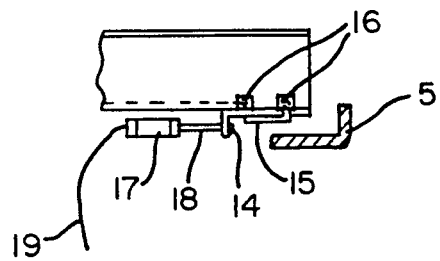
FIG. 6 is a cross sectional view taken along the line 6—6 in FIG. 4.

The drawing shows a vibrating conveyor 1 in accord with this invention for delivering a dry particulate material product 2 from a hopper 3 or other source to a plurality of longitudinally spaced material discharge locations 4 where the discharged material may be received in the hoppers 5 of packaging or other machines 6. Conveyor 1 has a plurality of longitudinally aligned, overlapping, open-ended conveyor pans 9, and each pan has an upper surface 10 upon which the material being conveyed is deposited and lower surface 11 underneath the pan. The line of tandem pans 9 is inclined slightly from the right to left side of the drawing so that material 2 will be conveyed from right to left in conventional manner. Each pan 9 has integral means such as a fin or member 12 centered on and extending away from its under surface 11. Fins 12 are separated and are aligned longitudinally of conveyor 1. Each pan 9 has an independently operable discharge gate 14 at its left end. Gates 14 are slidably mounted below pans 9 on slide rails 15 that are attached to the sides of the pans under tension from springs 16. Each gate 14 is moved from closed position in which no material is discharged from its pan (shown in full lines in FIG. 5) to open position in which material is discharged (shown in phantom in FIG. 5). A hydraulic or pneumatic cylinder 17 having a piston rod 18 attached to each gate 14 moves the gate to its closed and open positions, and the operation of cylinders 17 may be controlled by leads 19 from a conventional control circuit. Each pan 9 is supported independently of the other pans by two pairs of identical struts 20 that have one of their ends attached adjacent one corner of the pan. The opposite end of each strut 20 is secured to the outside of one of the longitudinal base frame members 21 of the conveyor. Struts 20 are sufficiently stiff and are rigidly connected to pans 9 and frame members 21 so that the struts can hold any pan 9 motionless when the other pans are vibrating, but struts 20 are sufficiently flexible and resilient to permit the pans to vibrate when connected to a source of vibration energy.

Figure 3:
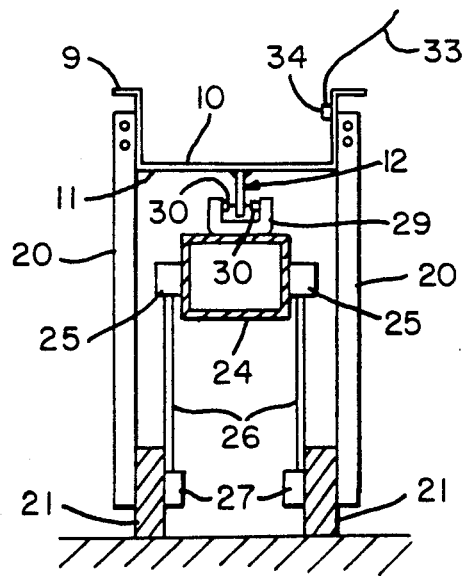
FIG. 3 is an enlarged cross sectional view taken along the line 3—3 in FIG. 1.
Figure 4:
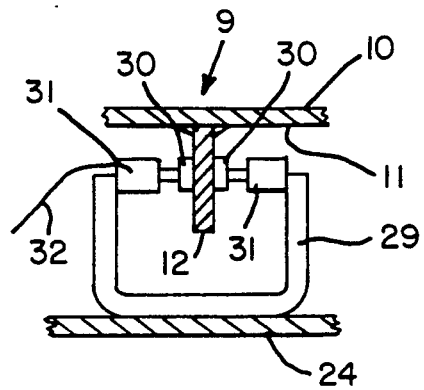
FIG. 4 is an enlarged partial cross sectional view showing the clamping mechanism in closed position.

Conveyor 1 includes a source of vibration energy, such as a known type of reciprocating drive mechanism 23 equipped with rotating unbalances that provide an inertial force sufficient to continuously vibrate a single source of vibrating movement for all of the pans 9. An elongated, longitudinally extending vibrating member such as box beam 24 is connected at one end to vibrating mechanism 23. Pairs of bearings 25 are attached to opposite sides of beam 24 at longitudinally spaced locations and are connected by rods 26 to similar pairs of bearings 27 attached to the insides of frame member 21. Beam 24 does not cause pans 9 to vibrate until the pans and beam are connected to each other. A plurality of clamps 29 are secured to beam 24 so that the clamps vibrate with the beam. Each clamp 29 has a pair of opposed jaws 30 located on opposite sides of one of the fins 12. Each pair of jaws 30 may be actuated by hydraulic or pneumatic cylinders 31 from an open position shown in FIG. 3 to a closed position shown in FIG. 4 where the pair of jaws grips one of the fins 12. Each pair of jaws may be selectively and independently controlled by a lead 32 from the previously mentioned control circuit. The control circuit also includes leads 33 connected to material level sensors 34 in each pan 9 and leads 35 connected to material level sensors in each machine 6.

Conveyor 1 selectively delivers particles of materials from their source 3 to any one or combination of the spaced material discharge locations 4 by selectively coupling and uncoupling predetermined pans 9 to continuously vibrating beam 24. To convey material 2 from source 3 to a predetermined machine 6 at one of the locations 4, all of the pans 9 between source 3 and such predetermined machine must be coupled to beam 24 by having the control circuit operating through leads 32, move the jaws 30 of the clamps 29 beneath such pans to their closed position where they are clamped to their associated fins 12. This causes each such pan to vibrate with beam 24, and since the open-ended pans 9 overlap and are aligned and inclined away from source 3, the material 2 will move across pans 9 away from source 3 toward the discharge location 4 for such predetermined machine. The control circuit will signal a lead 19 to actuate the cylinder 17 of a predetermined pan 9 to retract its gate 14, and material 2 will fall through the open gate into the hopper 5 for the particular machine 6 in need of the material. When that machine no longer needs material, its sensor will send a signal through its lead 35 to the control circuit, and the open gate 14 will be closed by its cylinder 17, jaws 30 will unclamp fins 12 which will uncouple pans 9 from beam 24. The uncoupled pans 9 will become motionless and movement of the material 2 will stop. The conveyor can supply material 2 to any number or all of the machines 6 by having all of the pans 9 between the material source 3 and the farthest machine 6 in need of material coupled to beam 24 and by opening the gates 14 of all pans 9 above the machines needing material 2. The pans 9 downstream from such farthest machine in need of material will not be coupled to beam 24 and will remain at rest in motionless isolation from the vibrating pans.

It is thus apparent that this invention includes methods of selectively delivering material 2 from source 3 to a plurality of spaced discharge locations 4 by aligning and inclining from source 3 toward locations 4 a plurality of overlapping conveyor pans 9. By supporting each pan 9 independently of the other pans on struts 20, each pan 9 may vibrate independently of the others or may be at rest in motionless isolation. Beam member 24 is independently supported on rods 26 and vibrated continuously by mechanism 23. By selectively coupling and uncoupling predetermined pans 9 to beam 24 by opening and closing clamps 29 on the appropriate fins 12, material 2 will be made to move across those pans that are coupled to beam 24 to any predetermined discharge location or locations 4.

While the invention has been described with reference to a particular embodiment, it is not intended to illustrate or describe herein all of the equivalent forms or ramifications thereof. Also, the words used, such as left and right, are words of description rather than limitation, and various changes may be made without departing from the spirit or scope of the invention disclosed herein. It is intended that the appended claims cover all such changes as fall within the true spirit and scope of the invention.

What is claimed is:

1. A vibrating conveyor for selectively delivering material from a source of material to a material discharge location comprising means for receiving said material, continuously vibrating member, and means for selectively coupling and uncoupling said material receiving means to said continuously vibrating member so that said means for receiving said material vibrates and said conveyor delivers said material to said material discharge location when said material receiving means is coupled to said continuously vibrating member, and said means for receiving said material is motionless when uncoupled from said continuously vibrating member and said conveyor stops delivery of said material to said discharge location when said means for receiving said material is uncoupled.

2. The invention defined in claim 1, wherein said material receiving means has a surface upon which said material is deposited and has an integral member extending away from said surface, said coupling means is connected to said continuously vibrating member so as to vibrate therewith, said coupling means has a movable member positioned and arranged to engage said integral member and means for moving said movable member into and out of engagement with said integral member, and said material receiving means is mounted on support means that permits vibrating movement when said movable member engages said integral member and that holds said material receiving means stationary when said movable member is out of engagement with said integral member.

3. The invention defined in claim 2, wherein said coupling means comprises clamping means.

4. The invention defined in claim 3, wherein said clamping means comprises a movable jaw for engaging said integral member.

5. The invention defined in claim 4, wherein said clamping means comprises a pair of opposed jaws located on opposite sides of said integral member for gripping said integral member therebetween.

6. The invention defined in claim 2, wherein said integral member comprises a fin located below said material receiving means.

7. The invention defined in claim 1, wherein said means for receiving said material comprises a pan having a slidable discharge gate at one of its ends.

8. The invention defined in claim 7, wherein said discharge gate is located below said pan means.

9. The invention defined in claim 1, wherein said continuously vibrating member comprises an elongated member located below said material receiving means.

10. A vibrating conveyor for selectively delivering material from a source of such material to a plurality of spaced material discharge locations comprising a plurality of aligned overlapping, inclined conveyor sections, a continuously vibrating member adjacent said conveyor sections, means for selectively coupling and uncoupling each conveyor section to said continuously vibrating member independently of the remaining conveyor sections, and means for mounting each of said conveyor sections for vibrating movement independent of the remaining conveyor sections when each such conveyor section is coupled to said vibrating member and for holding each conveyor section stationary when each such conveyor section is uncoupled from said continuously vibrating member, whereby selective coupling of one or more predetermined conveyor sections to said countinuously vibrating member will deliver said material to a predetermined one of said material discharge locations, and selective uncoupling of one or more predetermined conveyor sections from said continuously vibrating member will stop delivery of said material to said predetermined discharge location.

11. The invention defined in claim 10, wherein said continuously vibrating member extends longitudinally of said conveyor and said coupling means comprises clamping means.

12. The invention defined in claim 10, wherein each of said conveyor sections has an integral member extending therefrom, and said coupling means comprises a plurality of movable jaws each of which selectively clamps and unclamps a particular one of said integral means.

13. The invention defined in claim 12, wherein said clamping means comprises a plurality of pairs of opposed jaws, each pair of jaws being located on opposite sides of an integral member of one of said conveyor sections, said jaws gripping such integral member therebetween for coupling said one conveyor section to said continuously vibrating member.

14. The invention defined in claim 13, wherein said continuously vibrating means extends longitudinally of and below said conveyor sections, said integral members are a plurality of separated fins extending below said conveyor section.

15. The invention defined in claim 10, wherein in each of said conveyor sections comprises a pan means having an independently operable slidable discharge gate at one of its ends.

16. A vibrating conveyor for selectively delivering dry material from a source of such dry material to a plurality of spaced material discharge locations comprising a plurality of longitudinally aligned overlapping conveyor pans, each pan having an upper surface on to which said material is deposited, an integral fin extending from a lower surface underneath each pan, the fins on said pans being aligned and spaced from each other longitudinally of said conveyor, each pan having an independently operable slidable discharge gate at one of its ends below such pan, said pans being inclined from said source of material toward said discharge location, a continuously vibrating elongated beam extending longitudinally of said conveyor adjacent and below said fins, means for supporting said beam for vibrating movement without such vibrating movement being imparted to said pans, a plurality of clamps each comprising a pair of opposed jaws located on opposite sides of one of said fins, said clamps being attached to and movable with said elongated beam, means for mounting each of said pans for vibrating movement independent of the remaining pans and for holding each pan stationary independent of the movement of the remaining pans, and means for selectively moving each pair of jaws into and out of gripping engagement with their associated fin, and means for selectively sliding each pan discharge gate from closed to open position, whereby selective clamping of one or more fins to said beam will deliver said dry material to one or more predetermined material discharge locations, and selective unclamping of one or more of said fins from said beam will stop delivery of said dry material from one or more of said predetermined locations.

17. A method for selectively conveying material from a source of material to a material discharge location comprising the steps of:
   A. supporting a conveyor member that is inclined from said source toward said discharge location for vibrating movement and for motionless rest;
   B. placing said material on said conveyor member;
   C. locating a source of continuous vibrations adjacent said conveyor member; and
   D. selectively coupling and uncoupling said conveyor member to said source of continuous vibrations, whereby said material moves from said source toward said discharge location when said conveyor member is coupled to said source of continuous vibrations but such movement of said material stops when said conveyor member is uncoupled.

18. The invention defined in claim 17, wherein said conveyor member and said source of vibrations are selectively clamped to each other.

19. A method for selectively delivering material from a source of such material to a plurality of spaced discharge locations comprising the steps of:
   A. aligning and inclining from said source toward said discharge locations a plurality of overlapping conveyor sections;
   B. supporting each conveyor section independently of the others for independent vibrating movement and for motionless isolation from the others;
   C. depositing said material on a conveyor section;
   D. continuously vibrating and independently supporting a member adjacent said conveyor sections; and
   E. selectively coupling and uncoupling said conveyor sections to said of continuously vibrating member, whereby said material moves from said source to a selected discharge location or to selected locations depending on which conveyor sections are coupled to said of continuously vibrating member 20. The invention defined in claim 19, wherein said conveyor sections and said continuously vibrating member are selectively clamped to each other.

21. The invention defined in claim 19, further comprising coupling to said continuously vibrating member all of the conveyor sections located between said source of material and any predetermined discharge location to which said material is to be conveyed.

* * * * *